April 11, 1967  J. O. BENSON  3,313,247
FOOD PROCESSING APPARATUS
Filed Aug. 28, 1964  3 Sheets-Sheet 1
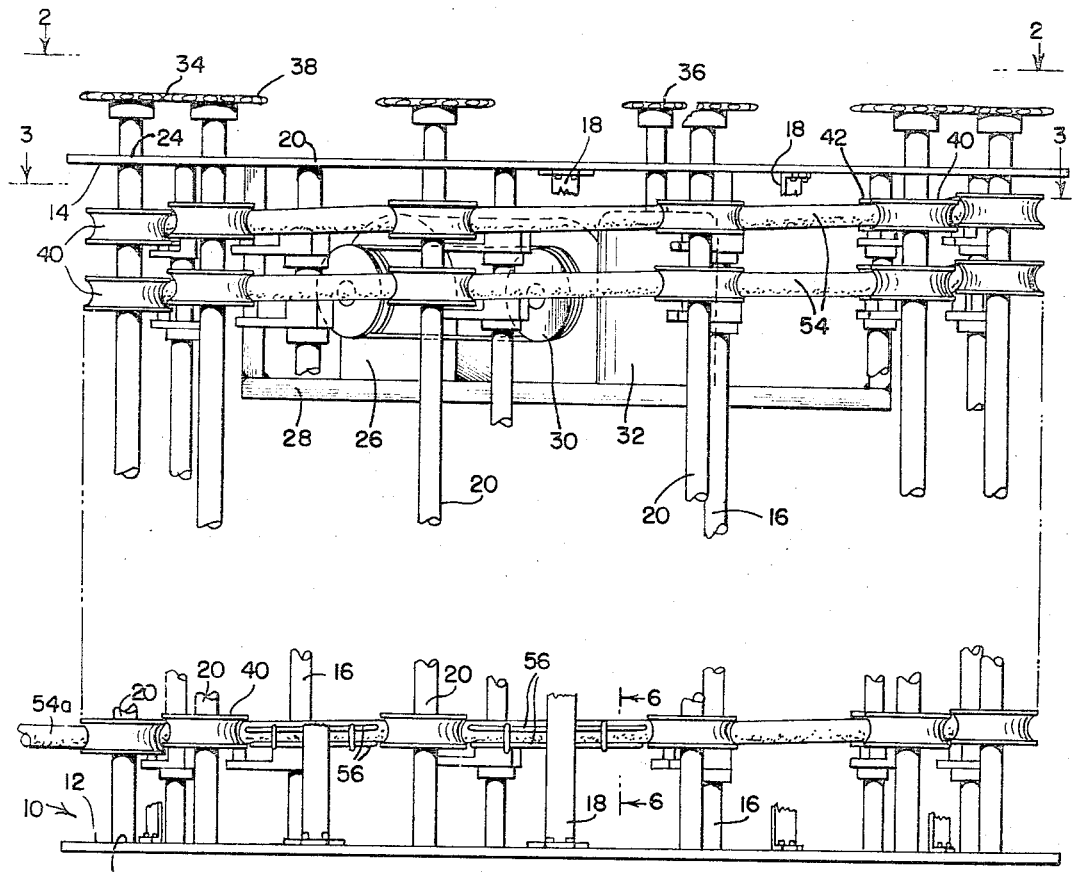
FIG. 1
FIG. 6
INVENTOR.
JOHN O. BENSON
BY
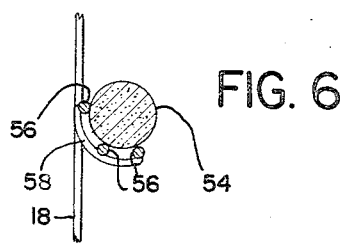
ATTORNEY April 11, 1967 J. O. BENSON 3,313,247
FOOD PROCESSING APPARATUS
Filed Aug. 28, 1964 3 Sheets-Sheet 3

INVENTOR.
JOHN O. BENSON
BY *Robert B. Hughes*
ATTORNEY

United States Patent Office 3,313,247
Patented Apr. 11, 1967

3,313,247
FOOD PROCESSING APPARATUS
John O. Benson, Mayer, Minn., assignor to General
Mills, Inc., a corporation of Delaware
Filed Aug. 28, 1964, Ser. No. 392,847
7 Claims. (Cl. 107—7)

This invention relates to an apparatus for processing a material, particularly a food material such as cooked dough, which is in an elongate or "rope-like" form.

The apparatus of the present invention was designed for use in a process such as that described in U.S. Patent No. 2,858,219. In this process, cooked dough is extruded into a "rope," which is then tempered for a period of time (i.e., exposed to air at a certain temperature and humidity for perhaps a half-hour or an hour) after which it is then cut into small wafers that are further processed to become a finished food product such as finished breakfast cereal flakes or snacks. When it is attempted to practice this on a high production commercial scale, it becomes evident that the amount of elongate dough which at any one time is going through this tempering step of the process, may reach out to a considerable length. Obviously, this creates problems in handling this dough so as not to deform it, and yet to provide for its exposure to the surrounding atmosphere, and in then feeding the dough into apparatus for subsequent processing (which in the process of the aforementioned U.S. patent is a slicing operation). If the process is to be continuous, the problems are intensified in that a considerable length of dough must in some manner be continuously conveyed. The prior art attempts to accomplish this, such as having a number of conveyor belts and intermediate guides to move the dough rope from one conveyor to the next, can best be described as cumbrous, requiring a good deal of plant space and equipment, and requiring a certain amount of attention to keep the operation going properly.

Accordingly it is an object of the present invention to provide an apparatus for processing an elongate product, such as that described above, which apparatus in a commercial operation can in a continuous manner reliably and properly temper the product.

More particularly it is an object to provide such an apparatus which is especially advantageous with respect to various considerations which are of importance in a commercial operation, such as economy of operation and of initial investment of equipment, requiring a small amount of operating area, ease and reliability of operation, ability to properly expose the food material to the surrounding atmosphere, etc.

It may be stated as another object of the present invention to provide an apparatus whereby what is normally considered to be a cumbrous and problematic processing step of handling a large quantity of rope-like food material in a manner to expose it to specific processing conditions, can be accomplished in a small area, with simple apparatus, and with relative ease.

These and other objects and features of the invention will be more readily understood and appreciated from the following detailed description of the preferred embodiment thereof selected for purposes of illustration and shown in the accompanying drawings, in which:

FIGURE 1 is a fragmentary side elevational view of the apparatus of the present invention;

FIGURE 6 is a sectional view taken on line 6—6 of FIGURE 1.

Figure 2:
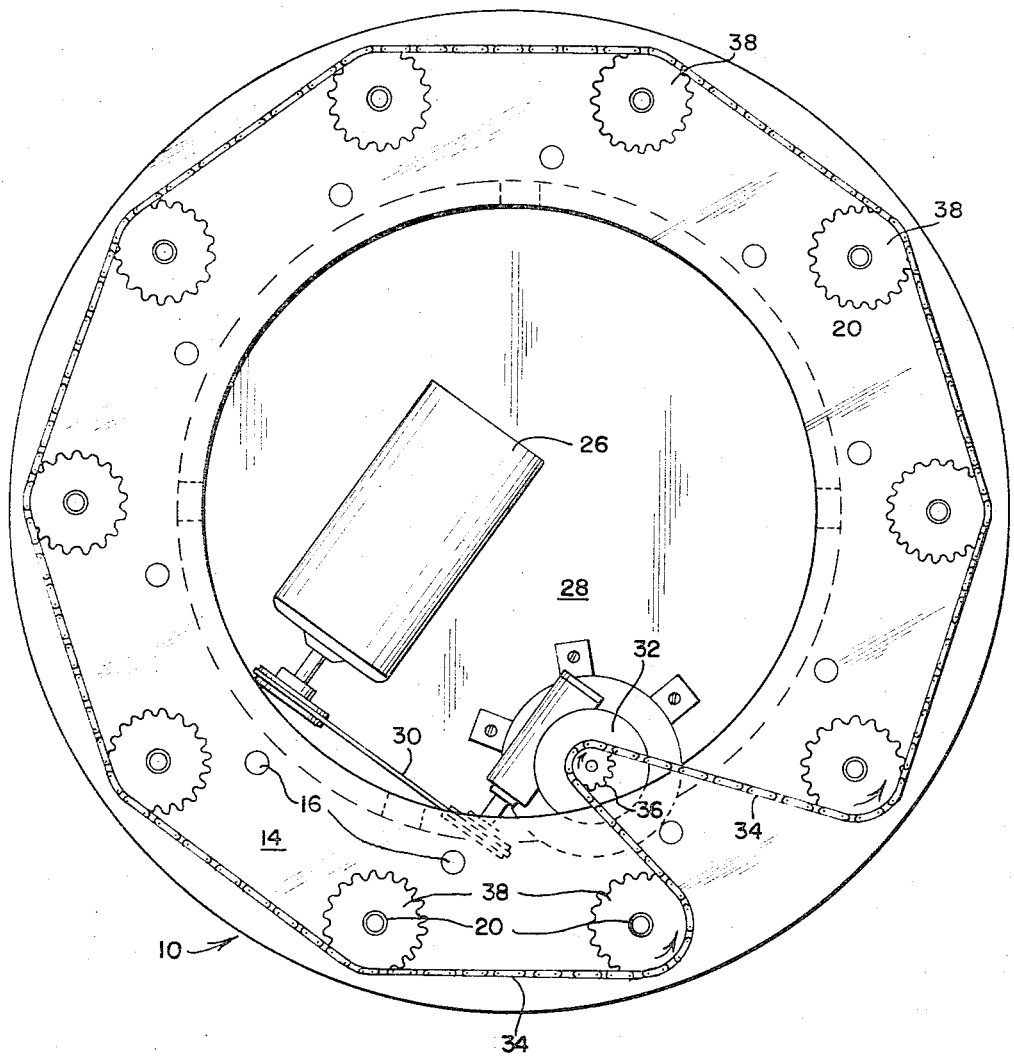
FIGURE 2 is a top plan view taken along the plane indicated at 2—2 of FIGURE 1.
Figure 3:
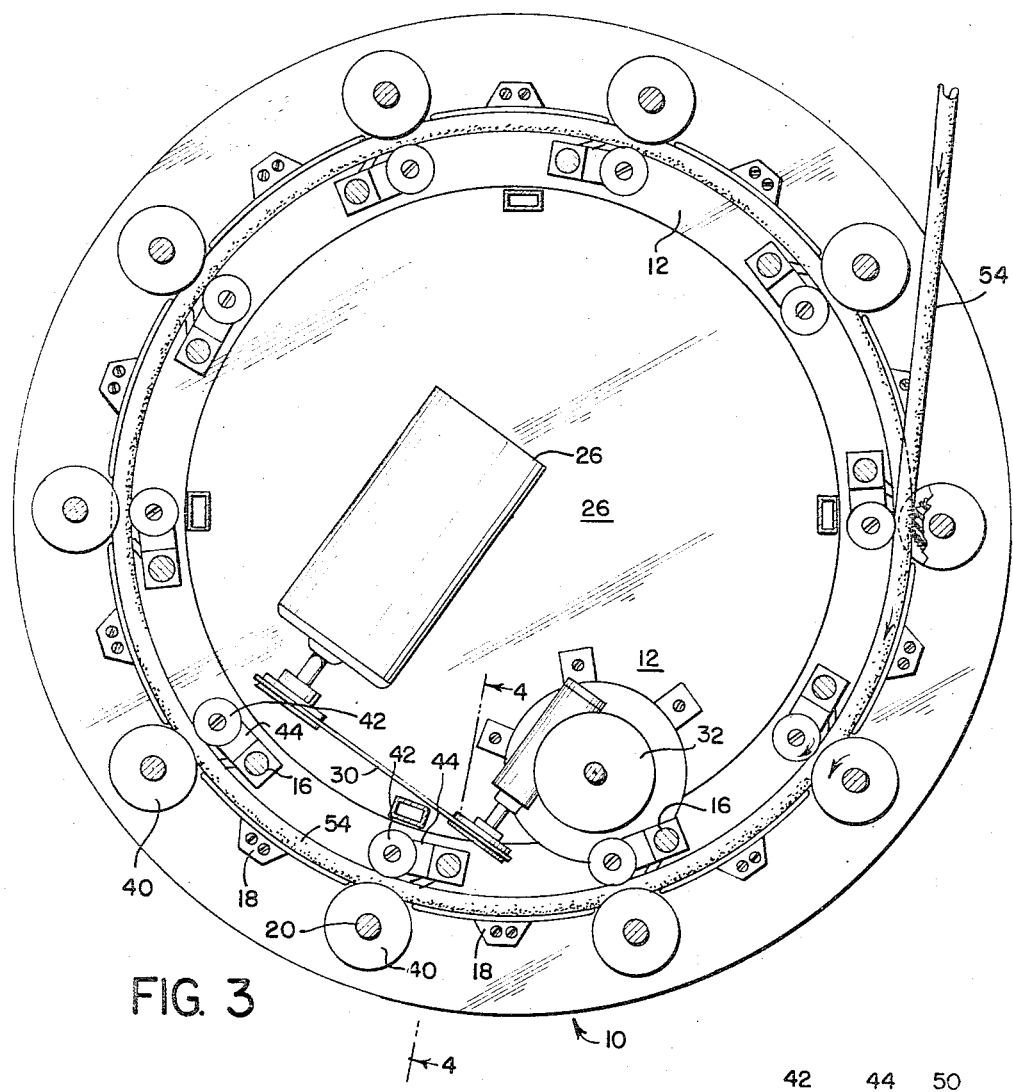
FIGURE 3 is a plan sectional view taken along line 3—3 of FIGURE 1.

As illustrated in the accompanying drawings, there is a stationary mounting frame 10 having the general configuration of a vertically disposed cylinder, and comprising a circular base plate 12 and a top annular frame member or ring 14. The top ring member 14 is supported from the base member 12 primarily by a plurality of vertical support rods 16, and is also braced by an equal number of vertical struts 18, each of the rods 16 and struts 18 reaching between, and being fixedly connected to, both the top and bottom frame members 14 and 12. Also reaching between the frame members 14 and 12 are a plurality of vertical shafts 20 which are journal mounted at 22 and 24 to, respectively, the bottom and top frame members 12 and 14, these shafts 20 also being equal in number to the support rods 16. The rods 16, struts 18 and shafts 20 are all located in a predetermined relationship with respect to one another and are arranged in a cylindrical pattern which reaches between and extends along the peripheral portions of the top and bottom frame members 14 and 12.

As will be described hereinafter, these rods 16, struts 18 and shafts 20 provide mountings for the various components which cooperate to cause a rope of cooked dough to be moved in a helical path about the cylindrical curve of the frame 10 so as to temper the dough. As shown herein, the progression of the dough in its helical path is (as seen from above) clockwise. For clarity of description, the movement of this dough at any one location will be considered to be forward and hence the terms "forward" and "rearward" will indicate directions clockwise and counter-clockwise, respectively, while the terms "inner" and "outer" will denote proximity to the center axis of the cylinder defined by the frame 10.

The apparatus is driven from an electric motor 26, which is mounted from the top frame member 14 by means of a secondary frame 28, and which through a chain and sprocket drive 30 and a speed reducing transmission 32, turns a main drive chain 34 by means of a drive sprocket 36. As illustrated in FIGURE 2, the drive chain 34 loops inwardly to engage the drive sprocket 36 and extends therefrom generally about the circumference of the top frame member 14 to engage each of a plurality of drive sprockets 38, each of which is fixedly connected to the top end of a respective one of the aforementioned drive shafts 20.

Each of the drive shafts 20 has fixed thereto at evenly spaced intervals therealong and concentric therewith, a plurality of drive rollers 40. Spaced a moderate distance inwardly from each drive roller 40 is a respective guide roller 42, mounted in such a manner as to be spring urged toward its related drive roller 40. This is conveniently accomplished by locating each of the supporting rods 16 moderately inward and counter-clockwise (i.e. rearward) from a related drive shaft 20. Each of the guide rollers 42 is journal mounted for rotation about a vertical axis from a related arm 44 which extends forwardly from, and is swing mounted about its supporting rod 16. To urge each guide roller 42 outwardly toward its related drive roller 40, there is provided below each arm 44, a related bracket 46 fixedly mounted to its related supporting rod 16 and projecting to the outside of its related mounting arm 44, and a tension spring 48 is connected between the bracket 46 and mounting arm 44 of each guide roller 42. So that the tension on each spring 48 may be adjusted, each bracket 46 is adjustably mounted to its rod 16, this being accomplished by having each bracket 46 sleeved (as at 50) onto its related rod 16, and providing a set screw 52 to hold the bracket 46 at the desired location.

Figure 4:
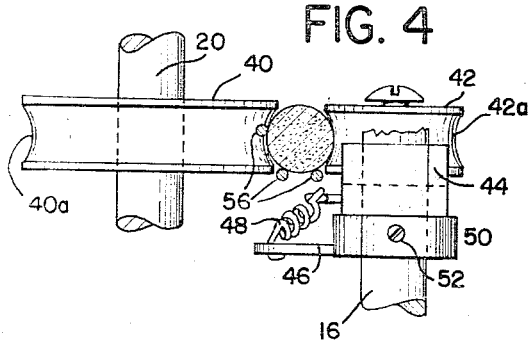
FIGURE 4 is a sectional view taken along line 4—4 of FIGURE 3 and drawn to an enlarged scale.
Figure 5:
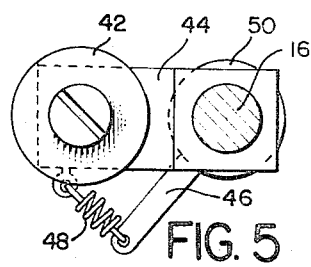
FIGURE 5 is an enlarged top plan view of one of the guide rollers and its associated spring device.

Each drive roller 40 is coplanar with its related guide roller 42, and each pair of proximate rollers 40–42 is located at an elevation slightly below the pair 40–42 to the immediate rear, so that the roller pairs 40–42 collectively define a descending helical path about the frame 10. In FIGURE 1, only the roller pairs 40–42 are shown which define the first two convolutions and the last convolution of the helical path, it being understood that any number of such roller pairs 40–42 could be provided so as to form a helical path of the desired length. The rope of dough 54 travels between each pair of proximate rollers 40–42; accordingly, as shown in FIGURE 4, the circumferential surface 40a and 42a of, respectively, rollers 40 and 42 are curved concavely (with reference to a section taken perpendicular to the circumference of either roller 40 or 42 at any point therealong) so that each pair of rollers 40–42 is better able to engage therebetween the rope of dough 54. Thus it can be seen that each pair of proximate rollers 40–42 cooperate as a unit to define a short segment of the aforementioned helical path which the dough rope 54 follows about the frame 10 of the apparatus.

Extending between each successive pair of rollers 40–42 so as to be adjacent the portion of the helical path extending between such roller sets 40–42, are several (three, as shown herein) curved guide rods 56, one placed outside of and two below the dough rope 54. These are conveniently mounted from support brackets 58 welded or otherwise secured to a related support strut 18, and each set of guide rods 56 serves to define that segment of the helical path between two successive roller pairs 40–42.

In operation, the motor 26 turns the main drive chain 34 in a counter-clockwise direction so that the drive sprockets 38 and their associated drive rollers 40 turn counterclockwise, with the inside face of the guide rollers 42 thus travelling in a forward (i.e. clockwise with respect to the center axis of the frame 10) direction. The front end of a rope of dough 54 is inserted between the uppermost drive roller 40 and its related guide roller 42, which roller pair or unit 40–42 defines the beginning of said helical path. The guide roller 42 presses the dough rope 54 with moderate pressure against the drive roller 40, which frictionally engages the dough rope 54, and being driven from its related drive sprocket 38 feeds the rope of dough 54 along the proximate set of guide rods 56 extending forwardly therefrom and thence between the next set of rollers 40–42. In like manner, each following unit or pair of the rollers 40–42 engages the dough rope 54 and feeds the same along the succeeding portion of the helical path. As the front portion of the dough rope 54 finally completes its helical path of travel, the front end of the dough rope is directed away from the apparatus of the present invention (as at 54a) to go through a processing step subsequent to the tempering step performed by the apparatus herein. Thus it can be seen that each increment of the dough 54 travels this helical path to be exposed to the surrounding atmosphere for a predetermined length of time.

It should be understood that the foregoing is merely illustrative of a certain embodiment of the invention and many variations may be made by those skilled in the art without departing from the spirit and scope of the invention.

Now, therefore, I claim:

1. An apparatus for continuously tempering an elongate food material or the like, said apparatus comprising: an elongate mounting frame having a longitudinal axis, a plurality of feed units, and means for mounting said feed units to the frame, said feed units being helically disposed at predetermined locations on said frame so that they collectively guide said material in a continuous helical path about the longitudinal axis of the frame, said helical path making a plurality of substantially equal size convolutions which are separated from each other by a prescribed distance, each of said units maintaining the convolutions spaced apart with respect to each other and being arranged to continuously engage said material and move it along said helical path.

2. The apparatus as recited in claim 1, wherein each of said feed units comprises a drive roller, which frictionally engages said material to move the same along said path.

3. An apparatus for continuously tempering an elongate food material or the like, said apparatus comprising:
   (a) a mounting frame having a longitudinal axis,
   (b) a plurality of transversely spaced drive shafts aligned longitudinally with said axis and journal mounted to said frame,
   (c) a plurality of drive rollers fixedly mounted to each shaft at predetermined locations therealong, each of said drive rollers being arranged to engage said material and move said material along a respective path segment,
   (d) said drive rollers being so disposed that said path segments define a continuous path which makes a plurality of substantially equal size convolutions about said axis, and
   (e) drive means to rotate said shafts so that said drive rollers, engaging said material, move said material along said continuous path.

4. The apparatus as recited in claim 3, wherein there are provided a plurality of guide rollers and means for mounting said rollers to said frame, said guide rollers being arranged to direct said material against said drive rollers.

5. The apparatus as recited in claim 3, wherein said shafts are arranged in a generally cylindrical pattern, and the drive rollers are so located on said shafts that they collectively guide said material in a generally helical path about the longitudinal axis of said frame.

6. An apparatus for continuously tempering an elongate food material or the like, said apparatus comprising:
   (a) a mounting frame having a longitudinal axis,
   (b) a plurality of transversely spaced drive shafts aligned longitudinally with said axis and journal mounted to said frame, said shafts being arranged in a generally cylindrical pattern,
   (c) a plurality of drive rollers fixedly mounted to each shaft at predetermined locations therealong, each of said drive rollers being arranged to engage said material and move said material along a respective path segment,
   (d) said drive rollers being so disposed that said path segments define a continuous path which makes a plurality of convolutions about said axis, and said rollers being located on said shafts so that they collectively guide said material in a generally helical path about the longitudinal axis of said frame,
   (e) drive means to rotate said shafts so that said drive rollers, engaging said material, move said material along said continuous path, and
   (f) guide means along each path portion between successive drive rollers for directing said material along said helical path.

7. An apparatus for continuously tempering an elongate food material or the like, said apparatus comprising: an elongate mounting frame having a longitudinal axis, a plurality of feed units, means for mounting said feed units to the frame, said feed units being disposed at predetermined locations on said frame so that they collectively guide said material in a continuous helical path about the longitudinal axis of the frame, said helical path making a plurality of substantially equal size convolutions which a plurality of substantially equal size convolutions which are separated from each other by a prescribed distance, each of said units being arranged to continuously engage said material and move it along said helical path, each of said feed units comprising a drive roller which frictionally engages said material to move the same along said path, and guide means for said material between successive feed units.

(References on following page)

References Cited by the Examiner

UNITED STATES PATENTS

| | | | |
|---|---|---|---|
| 1,874,973 | 8/1932 | Hambrecht | 107—4.7 |
| 2,207,795 | 7/1940 | Grimm | 107—9.2 |
| 2,591,546 | 4/1952 | Hettinger | 107—10 X |
| 2,802,564 | 8/1957 | Durr | 226—119 |
| 2,808,258 | 10/1957 | Waychoff | 226—119 X |
| 3,127,079 | 3/1964 | Allander | 226—119 X |
| 3,239,948 | 3/1966 | DiMino | 34—161 |

WALTER A. SCHEEL, *Primary Examiner.*

J. SHEA, *Assistant Examiner.*